PHONOGRAPH CARTRIDGE

Filed Nov. 1, 1963 2 Sheets-Sheet 1

INVENTORS:
WILLIAM A. CAVAGNARO,
ROY DALLY,

BY Thomas A. Briody
THEIR ATTORNEY.

PHONOGRAPH CARTRIDGE

Filed Nov. 1, 1963 2 Sheets-Sheet 2

INVENTORS:
WILLIAM A. CAVAGNARO,
ROY DALLY,

BY Thomas A. Briody
THEIR ATTORNEY.

3,266,809
Patented August 16, 1966

3,266,809
PHONOGRAPH CARTRIDGE

William A. Cavagnaro, Decatur, and Roy Dally, Warrensburg, Ill., assignors to General Electric Company, a corporation of New York Filed Nov. 1, 1963, Ser. No. 320,910
8 Claims. (Cl. 274—26)

This invention relates to phonograph pickup cartridges, and in particular to the type of stereo pickup cartridges which employ transducer elements.

An important object of our invention is to provide an improved phonograph cartridge which includes a novel arrangement for securing a plurality of transducer elements thereto.

Another object of this invention is to provide an improved phonograph cartridge which incorporates a novel simplified housing structure.

A further object of this invention is to provide an improved phonograph cartridge which is sturdy, efficient, dependable, and economical to manufacture.

A still further object of the present invention is to provide an improved housing structure for a phonograph cartridge, which structure includes a minimum number of parts.

In accordance with this invention, in one form thereof, there is provided a phonograph pickup cartridge including a pair of transducer elements arranged in geneally transverse spaced apart and crisscross relationship. These transducer elements are connected to cooperating sections of a resilient coupler which transmits the signal responsive vibrations from a drive rod. By this invention, to support and contain the transducer elements and coupler, a two part housing is utilized, which includes a body and a cover. The body has a recess therein for receiving the transducer elements and coupler, and a pair of inclined surfaces for supporting a pair of associated resilient blocks secured to respective upper ends of the transducer elements. The cover of the housing includes a depending rib which has a pair of slanted surfaces thereon. For securing the transducer elements and their associated coupler into engagement with the housing, the cover is fitted into cooperative engagement with the housing body, and the slanted surfaces on the depending rib of the cover compress the resilient blocks into engagement with the inclined surfaces of the body. A simplified and effffective means has thus been provided for mounting the transducer elements to the cartridge housing.

By a further aspect of this invention, an extension of the depending rib of the housing cover cooperates with an associated slot of the housing body to facilitate the convenient securement of the housing members together.

Further aspects of this invention will become apparent hereinafter, and the specification concludes with claims particularly pointing out and distinctly claiming the subject matter which we regard as our invention. The invention, however, as to organization and method of operation, together with further objects and advantages thereof, may best be understood by reference to the following description, when taken in conjunction with the accompanying drawings, in which:

Figure 1:
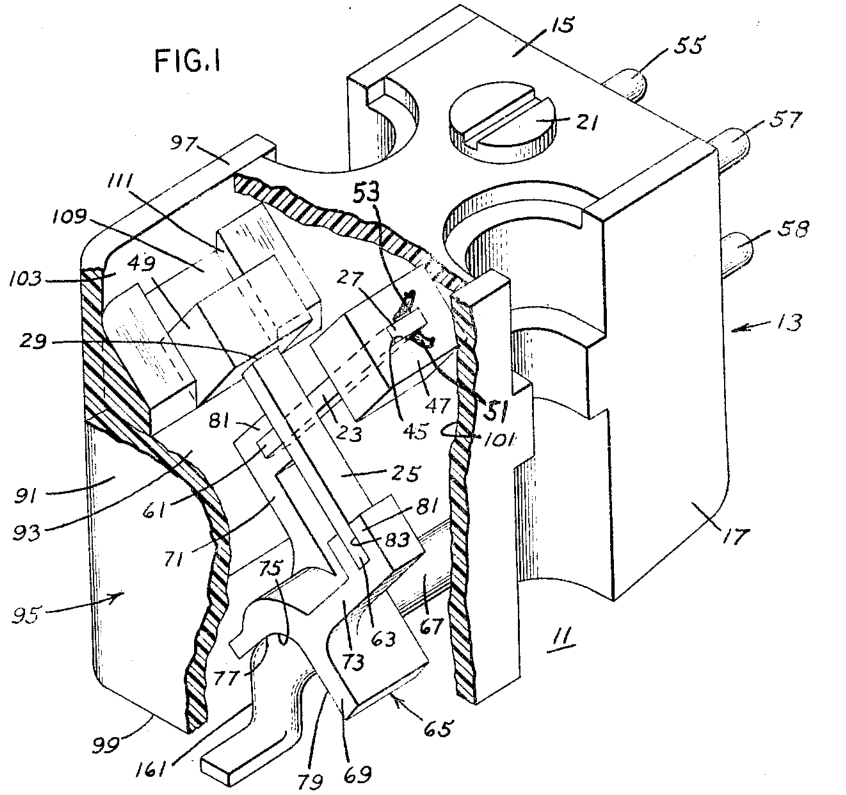
FIG. 1 is a perspective view of a stereo phonograph pickup cartridge embodying one form of the present invention, part of the housing being broken away to show the interior construction thereof.
Figure 2:
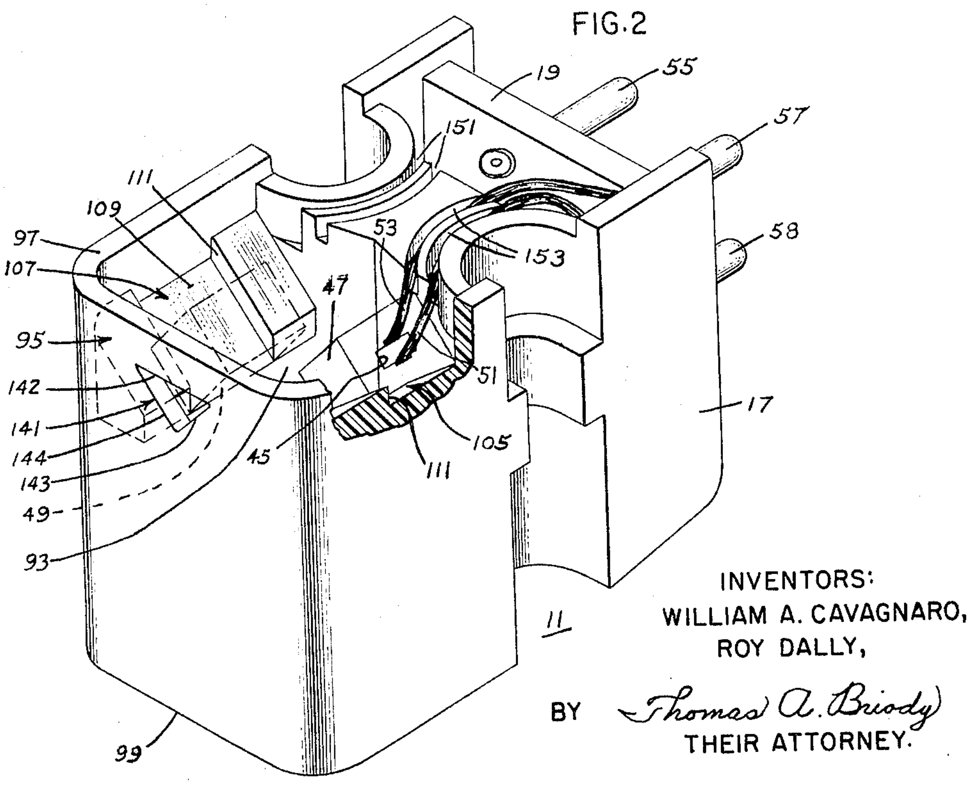
FIG. 2 is a perspective view similar to FIG. 1, but with the cover and transducer assembly removed.

Referring in detail to the drawings, and in particular, initially, to FIGS. 1 and 2, there is shown a ceramic stereo pickup cartridge 11 which comprises a housing 13 that includes an upper cover part 15, a lower body 17, and end terminal board 19. The three parts 15, 17 and 19 are secured together by a suitable single fastening means such as screw 21 which cooperates with a mating nut (not shown). The housing 13, including the mode of cooperation of its cover and body parts 15, 17, and its mode of cooperation with the operative elements of the cartridge 11, forms an important aspect of the present invention, as shall become apparent hereinafter.

To provide a sound generating subassembly for the illustrated pickup cartridge 11, it includes a pair of elongated ceramic transducer elements 23 and 25 arranged transversely in the housing, in spaced apart proximity and crisscross fashion with respect to each other. The transducer elements 23 and 25 are the type of generators which use the bender mode of operation, and each of these elements may include two relatively thin strips of a ceramic material such as barium titanate, which have been bonded together with suitable materials between them.

As further shown in FIG. 1, the elements 23 and 25 are in the shape of elongated relatively flat bars disposed in edgewise relationship with each other. At their upper ends 27 and 29, respectively, elements 23 and 25 are extended through, ensconced in and retained by slots 45 formed in associated resilient blocks 47 and 49, these blocks 47 and 49 may be beneficially constructed from butyl rubber, some of the desirable characteristics of which are set forth below.

The bared ends of a pair of conductors are located in each slot 45 for engagement with its associated transducer. The flat opposed sides of each of the upper ends 27 and 29 of the transducer elements are thus connected to two conductors in the manner illustrated by way of example for conductors 51 and 53 of FIG. 1. Conductors 51 and 53 are connected to an associated pair of terminal pins 57 to 58.

The lower ends 61 and 63 of the ceramic transducer elements 23 and 25 cooperatively engage coupler 65, which mechanically links them to drive rod 67.

The coupler 65 is preferably formed from a rubber-like material, such as the aforementioned butyl rubber, which is highly resilient, readily deformable, and has a rapid and complete restoring force. To put this another way, such a material may be said to be able to quickly restore itself to its original shape upon first being deformed and then subsequently released.

Figure 5:
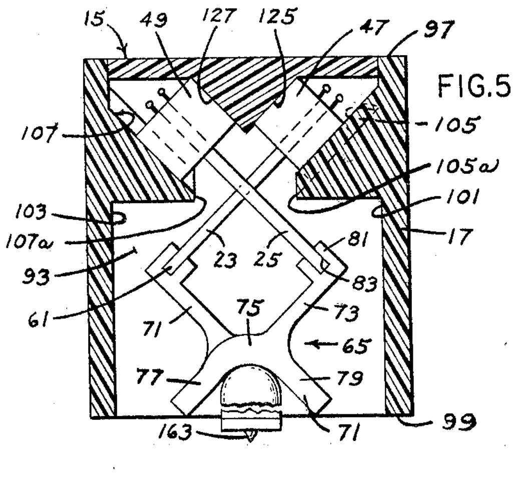
FIG. 5 is a sectional view taken generally along the line 5—5 of FIG. 3.

The configuration of coupler 65 is such that it includes, in general, a downwardly concave body portion 69, and a pair of offset arms 71, 73 extending divergently upwardly and outwardly therefrom (FIG. 5). More particularly, as best shown in FIGS. 1 and 5, the body portion 69 of the coupler includes a curved section 75 on its bottom central surface. The bottom surface of coupler body 69 also includes a pair of planar sections 77, 79 extending outwardly and downwardly in tangential fashion from the opposite sides of the curved section 75.

From the upper surface of the body portion 69 of coupler 65, the arms 71 and 73 extend radially upwardly and outwardly in divergent fashion from the axis of curvature of curved section 75. Each of the arms 71 and 73 is disposed at an angle of approximately 45 degrees relative to the horizontal (see FIG. 5). In addition, the arms 71 and 73 are spaced apart or offset in a direction between the front and rear walls of the cartridge housing. At the upper flat ends of each of the arms 71 and 73, there is integrally formed a pair of perpendicularly extended supporting fingers 81 with a slot 83 therebetween. Between each pair of parallel supporting fingers 81 there is positioned and secured in the slot 83, an associated end 61 or 63 of one of the transducer elements 23 and 25.

Figure 3:
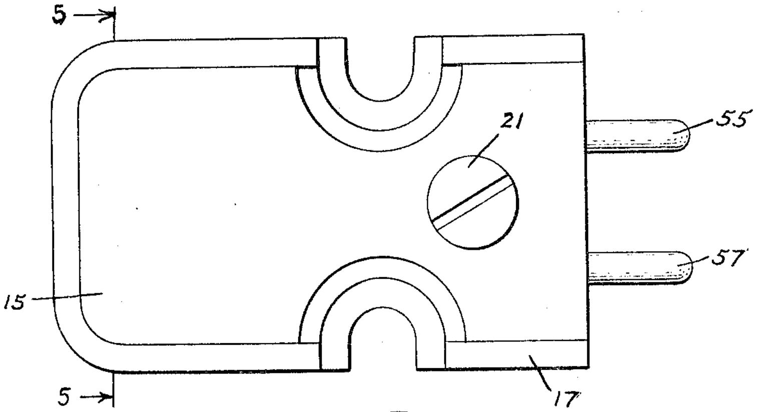
FIG. 3 is a plan view of the cartridge of FIG. 1.
Figure 4:
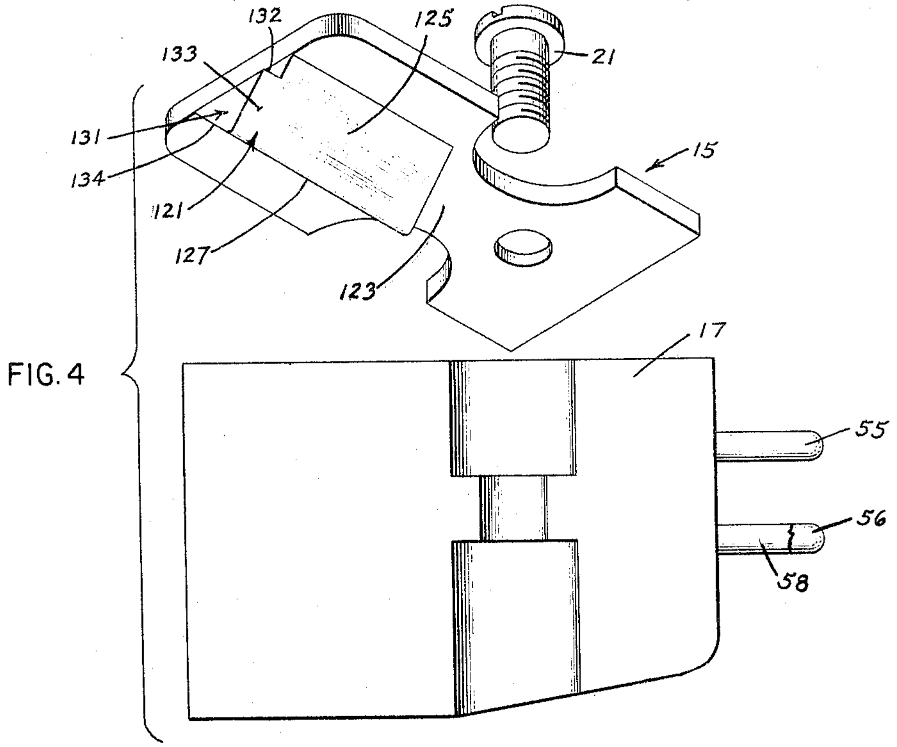
FIG. 4 is an exploded view of the housing for the cartridge.

Turning now to an important aspect of the present invention, which concerns an improved housing arrangement for the cartridge 11 that effectively secures the transducer elements thereto, attention is directed to FIGS. 3–5. The body 17 of the cartridge housing 13 is generally of box shaped configuration, and near front vertical wall 91 thereof, a recess 93 is formed therein. The recess 93 extends vertically through the body 17 near its front end 95, opening upwardly into top wall 97 and downwardly into bottom wall 99 to facilitate the placement and operation of the ceramic transducer and coupling subassembly in the body 17.

For supporting the transducer and coupling subassembly in cartridge housing 13, on the opposed inside walls 101 and 103 of the recess 93, there are integrally formed associated inclined slides 105 and 107, which extend downwardly and inwardly in generally convergent fashion. More particularly, the slides 105 and 107 are identically constructed (as shown in FIGS. 1 and 2) to each include an inclined surface 109 disposed at an angle of approximately 45 degrees to a horizontal plane (viewing FIG. 5). The inclined surface 109 of each slide is bounded from its front to rear by opposed walls 111 which are spaced apart by a suitable distance to accommodate an associated one of the resilient blocks 47 and 49. Walls 111 also limit any undesirable movement of these blocks in a direction between the front and rear of the cartridge.

As further shown in FIGS. 2 and 5, the slides 105 and 107 are slightly offset from each other in a direction between the front and rear of the cartridge housing, to accommodate the offset relationship of blocks 47 and 49. More particularly, as shown in FIG. 2, the slide 105, which accommodates resilient block 47, is located further away i.e. rearwardly from the front wall 95 of the cartridge housing than is slide 107, which accommodates the resilient block 49.

For the illustrated cartridge 11, the lateral distance from the bottom **107*a* of slide 107 to the bottom 105*a* of slide 105 is considerably smaller than the lateral distance between the outermost lateral extremities of arms 71, 73 and coupler body 69. However, the longitudinal distance from the front surface of arm 73 to the rear surface of arm 71 (FIG. 1), and the longitudinal distance from the front surface of coupler body 69 and its rear surface (FIG. 1), both of these distances are less than the lateral distance from the bottom 107*a* of slide 107 to the bottom 105*a* of slide 105 (FIG. 5). In view of this, for assembling the transducer and coupler subassembly into recess 93, the subassembly is first rotated 90 degrees from its desired position relative to the housing for purpose of insertion from above body 17. The subassembly may then be positioned in the recess 93 from above body 17, with blocks 47 and 49 located a little bit above and 90 degrees away from their associated slides 105 and 107, and rotated 90° for placement of the subassembly into the desired position on body 17** (as shown in FIGS. 1 and 5).

As shown in FIGS. 1, 3 and 5, the cover 15 fits into cooperative engagement with recessed body 17 to help form the cartridge housing 13. To enable cover 15 to firmly grip the transducer elements and also enhance the connections of the conductors to the transducer ends, as shown in FIG. 4, there is a wedge-shaped depending rib 121 formed on the bottom surface 123 of cover 15. Rib 121 has the configuration of a prism having an isosceles triangular cross section, and it includes two inclined elongated surfaces 125, 127. The surfaces 125 and 127 are at 45 degree angles to the horizontal so that they are in parallel relationship to the inclined surfaces 109 of the slides 105, 107 when cover 15 is in its seated position.

As thus shown in FIG. 5, when cover 15 is secured into engagement with housing body 17, the wedge shaped rib 121 of the cover 15 compressively engages and cooperates with the resilient blocks 47 and 49 to secure these blocks into securely supported engagement with the housing 13. By means of the compressive force exerted upon each of the blocks 47 and 49 by its associated inclined surface of rib 121, any undesirable movement of the elements 23 and 25 in a generally vertical plane is thereby effectively restrained.

It will be further noted from viewing FIG. 4, that the wedge shaped rib 121 includes a forward extension 131. The extension 131 is spaced downwardly from surface 123 of cover 15, and has an isosceles triangular cross sectional configuration of smaller area than the main portion of rib 121. The purpose of extension 131 is to cooperate with a triangular shaped slot 141 formed in front wall 95 of body 17. Thus, as shown by viewing both FIGS. 2 and 4, shoulder 132 of the rib extension 131 fits into contiguity with upper surface 142 of body slot 141, and angular surfaces 133, 134 of extension 131 fit into contiguity with angular surfaces 143, 144 of slot 141.

By means of the cooperative engagement of extension 131 of housing cover 15 with slot 141 of housing body 17, only a single fastening operation (e.g. the securement of screw 21 to a suitable nut) is required to assemble the housing parts together.

For effectively segregating the conductors connected between transducer elements 23, 25 and pins 55–58 on terminal board 19, two pairs of curved grooves 151 and 153 are formed in a top central wall of body 17. When cover 15 is placed into cooperative engagement with body 17, the conductors are thereupon securely entrapped in their associated grooves 151 and 153 to mechanically segregate them from each other.

In the illustrated pickup cartridge 11, the drive rod 67 is secured to, carried by, and extends forwardly from a resilient means (not shown). The front end 161 of the drive rod 67 is bent downwardly and then forwardly, being flattened at the extreme end, which has a single stylus 163 extending downwardly therefrom (FIG. 5). For the type of drive rod illustrated in FIG. 1, it is understood that the supported end of the rod must be rigidly held in such a manner as to prevent any undesirable movement threof. It is also understood that a drive rod having its free end in general axial alignment with its main body portion (i.e. a straight rod type) may also be advantageously used with the present invention.

It will now, therefore, be seen that the present invention provides an improved stereophonic pickup cartridge which is simplified in construction and includes a novel housing arrangement. It will also be realized that this invention provides an improved means for securing a pair of transducer elements into a cartridge housing.

While, in accordance with the patent statutes, we have described what at present is considered to be the preferred embodiment of our invention, it will be obvious to those skilled in the art that various changes and modifications may be made therein without departing from our invention and we, therefore, aim in the following claims to cover all such equivalent variations as fall within the true spirit and scope of this invention.

What we claim as new and desire to secure by Letters Patent of the United States is:

1. A stereo phonograph pickup cartridge comprising a housing that includes first and second cooperable members, a stylus assembly including a drive rod positioned in said housing, a pair of elongated transducer elements, first resilient means connected to said elements, said transducer elements being arranged in spaced apart and crisscross relationship in said first housing member and supported therein by engagement of said first resilient means with said first housing member, second resilient means for coupling said transducer elements to said drive rod, and means including a wedge-shaped projection on one of said housing members which compressively engages said first resilient means when said first and second housing members are cooperatively engaged thereby to securely and positively fasten said transducer elements into resiliently supported engagement with said housing.

2. A stereo phonograph pickup cartridge comprising a housing that includes first and second cooperable members, a stylus assembly including a drive rod positioned in said housing, a pair of elongated transducer elements, a pair of resilient bodies one of which substantially surrounds a portion of each transducer element near one end thereof, said transducer elements being arranged in spaced apart and crisscross relationship in said first housing member and supported therein by engagement of said resilient bodies with associated surfaces of said first housing member, a resilient coupler for connecting the ends of said transducer elements remote from said resilient bodies to said drive rod, and means including a wedge shaped projection on said second housing member which compressively engages each of said resilient bodies when said first and second housing members are cooperatively engaged thereby to securely and positively fasten said transducer elements into resiliently supported engagement with said housing.

3. A stereo phonograph pickup cartridge comprising a housing that includes a recessed body and a cover cooperable with said body, a pair of opposed vertically inclined slides formed on opposite interior side walls of said body, a stylus assembly including a drive rod positioned in said housing, a pair of elongated transducer elements, a pair of resilient bodies one of which substantially surrounds a portion of each transducer element near one end thereof, said transducer elements being arranged transversely in spaced apart relationship within said body and supported therein by the positioning of said resilient bodies on said slides, a resilient coupler for connecting said transducer elements to said drive rod, and a depending wedge-shaped rib formed on the underside of said cover, said rib including a pair of inclined surfaces, each of said inclined surfaces of said rib being positioned thereon to compressively engage an associated one of the resilient bodies when said body and cover are cooperatively engaged thereby to securely and poistively fasten said transducer elements into resiliently supported engagement with said housing.

4. The stereo pickup cartridge of claim 3 wherein each of said slides are vertically inclined downwardly and inwardly at an angle of approximately 45 degrees from the horizontal and each of the inclined surfaces of said rib is in parallel relationship with an associated one of said slides when said cover is in cooperative engagement with said housing body.

5. The stereo pickup cartridge of claim 3 wherein said cover rib includes a longitudinal extension, said housing body having a slot formed in one wall thereof for receiving the extension of said rib, the cooperative engagement of said extension with said slot thereby reducing the amount of hardware required to securely assemble said cover and body together.

6. The stereo pickup cartridge of claim 5 wherein said body includes a plurality of integral conductor insulating segregating grooves, said grooves being arranged to receive portions of conductors connected to said transducer elements, and being cooperable with said cover to entrap said conductor portions into segregated positions within said housing.

7. A phonograph pickup cartridge comprising a housing that includes first and second cooperable members, a stylus assembly including a drive rod positioned in said housing, a pair of elongated transducer elements disposed in said housing, first resilient means connected to said elements and engaging one of said housing members thereby to support said elements in said housing, second resilient means for coupling said transducer elements to said drive rod, and means including a wedge-shaped projection formed on the other of said housing members for compressively engaging said first resilient means when said first and second housing members are cooperatively engaged thereby to securely and positively fasten said transducer elements into resiliently supported engagement with said housing.

8. A stereo phonograph pickup cartridge comprising a housing that includes first and second cooperable members, a stylus assembly including a drive rod positioned in said housing, a pair of elongated transducer elements, a pair of resilient bodies one of which substantially surrounds a portion of each transducer element near one end thereof, said transducer elements being arranged in spaced apart and crisscross relationship in said first housing member and supported therein by engagement of said resilient bodies with associated surfaces of said first housing member, a resilient coupler for connecting the ends of said transducer elements remote from said resilient bodies to said drive rod, means including a wedge shaped longitudinally extending rib on said second housing member which compressively engages each of said resilient bodies when said first and second housing members are cooperatively engaged thereby to securely and positively fasten said transducer elements into resiliently supported engagement with said housing, and an extension formed on said rib for cooperative engagement with an associated slot formed in said first housing member thereby to facilitate the securement of said first and second housing members together.

References Cited by the Examiner

UNITED STATES PATENTS 3,183,311 5/1965 McAlvay __________ 274—37 X

NORTON ANSHER, *Primary Examiner.*

C. B. PRICE, *Assistant Examiner.*